(12) United States Patent
Miles

(10) Patent No.: US 11,371,196 B2
(45) Date of Patent: Jun. 28, 2022

(54) SINGLE DRUM SURFACE COMPACTOR MACHINE

(71) Applicant: Volvo Construction Equipment AB, Eskilstuna (SE)

(72) Inventor: Robert Miles, Shippensburg, PA (US)

(73) Assignee: Volvo Construction Equipment AB, Eskilstuna (SE)

( * ) Notice: Subject to any disclaimer, the term of this patent is extended or adjusted under 35 U.S.C. 154(b) by 265 days.

(21) Appl. No.: 16/623,874

(22) PCT Filed: Jun. 19, 2017

(86) PCT No.: PCT/IB2017/053629
§ 371 (c)(1),
(2) Date: Dec. 18, 2019

(87) PCT Pub. No.: WO2018/234844
PCT Pub. Date: Dec. 27, 2018

(65) Prior Publication Data
US 2021/0140128 A1    May 13, 2021

(51) Int. Cl.
*E01C 19/28* (2006.01)
*H02K 7/06* (2006.01)
*H02K 7/18* (2006.01)

(52) U.S. Cl.
CPC ........... *E01C 19/286* (2013.01); *H02K 7/063* (2013.01); *H02K 7/1815* (2013.01)

(58) Field of Classification Search
CPC ..... E01C 19/286; H02K 7/063; H02K 7/1815
(Continued)

(56) References Cited

U.S. PATENT DOCUMENTS 2,549,182 A    4/1951  Ekenstam
2,611,443 A    9/1952  Paramythioti
(Continued)

FOREIGN PATENT DOCUMENTS

CN    2535446 Y    2/2003
CN    2772193 Y    4/2006
(Continued)

OTHER PUBLICATIONS

International Search Report and Written Opinion of the International Searching Authority, PCT/IB2017/053629, dated Sep. 21, 2017, 5 pages.
(Continued)

*Primary Examiner* — Raymond W Addie
(74) *Attorney, Agent, or Firm* — Sage Patent Group

(57) ABSTRACT

A surface compactor machine includes a cylindrical drum defining a cylindrical space in an interior portion of the cylindrical drum and having a central axis of rotation, and a counterweight in the cylindrical space. The compactor further includes a non-driven support wheel affixed to the counterweight and in contact with an underlying portion of an interior surface of the cylindrical drum beneath the counterweight. A drive motor is provided in the cylindrical space, and a drive wheel is mechanically rotatable by the drive motor. The drive wheel contacts an inner surface of the cylindrical drum such that rotation of the drive wheel by the drive motor urges the cylindrical drum to rotate about the central axis of rotation.

21 Claims, 4 Drawing Sheets

(58) Field of Classification Search
USPC .......................................... 404/72, 84.05, 117
See application file for complete search history.

(56) References Cited

U.S. PATENT DOCUMENTS

| | | | |
|---|---|---|---|
| 3,635,134 A | | 1/1972 | Thomas |
| 3,871,788 A | * | 3/1975 | Barsby .................. E01C 19/283 |
| | | | 404/117 |
| 4,192,626 A | | 3/1980 | Wyckoff et al. |
| 4,342,523 A | * | 8/1982 | Salani .................. E01C 19/286 |
| | | | 74/61 |
| 7,775,742 B2 | | 8/2010 | Buijsman |
| 2004/0114998 A1 | | 6/2004 | Magee et al. |
| 2008/0092725 A1 | | 4/2008 | Simula et al. |
| 2015/0308057 A1 | * | 10/2015 | Marsolek .............. E01C 19/286 |
| | | | 29/401.1 |
| 2015/0337502 A1 | * | 11/2015 | Wadensten .............. E01C 19/24 |
| | | | 404/117 |
| 2016/0102438 A1 | * | 4/2016 | Kreische .................. F16C 3/28 |
| | | | 74/571.11 |
| 2016/0201275 A1 | * | 7/2016 | Oetken ................. E01C 19/286 |
| | | | 404/117 |
| 2018/0171567 A1 | * | 6/2018 | Macdonald ........... F16F 15/223 |

FOREIGN PATENT DOCUMENTS

| | | |
|---|---|---|
| CN | 101305134 A | 11/2008 |
| CN | 102653935 A | 9/2012 |
| CN | 104441201 A | 3/2015 |
| CN | 105064176 A | 11/2015 |
| CN | 205276106 U | 6/2016 |
| CN | 106149754 A | 11/2016 |
| CN | 206256352 U | 6/2017 |
| DE | 2325802 A1 | 12/1974 |
| GB | 942941 A | 11/1963 |
| GB | 1460676 A | 1/1977 |
| GB | 2164304 A | 3/1986 |
| IT | 1185901 B | 11/1987 |
| SU | 973705 A1 | 11/1982 |

OTHER PUBLICATIONS

Chinese First Office Action dated Apr. 6, 2021 for Chinese Patent Application No. 201780092272.0, 23 pages (including English translation).

Extended European Search Report dated Dec. 23, 2020 for European Patent Application No. 17915168.3, 7 pages.

* cited by examiner

SINGLE DRUM SURFACE COMPACTOR MACHINE

CROSS REFERENCE TO RELATED APPLICATIONS

This application is a 35 U.S.C. § 371 national stage application of PCT International Application No. PCT/IB2017/053629 filed on Jun. 19, 2017, the disclosure and content of which are incorporated by reference herein in their entirety.

FIELD

The inventive concepts relate to surface compactors machines, and, in particular, to single-drum surface compactor machines.

BACKGROUND

Surface compactor machines, or surface compactors, are used to compact a variety of substrates, such as asphalt and soil. Surface compactors are provided with one or more compacting surfaces for this purpose. For example, a roller compactor may be provided with one or more cylindrical drums that provide compacting surfaces for compacting soil, asphalt, or other materials.

Roller compactors use the weight of the compactor to compress the surface being rolled. In addition, one or more of the drums of some roller compactors may vibrate to induce additional mechanical compaction of the surface being rolled.

Heavy duty surface compactors typically have two rollers or drums, e.g., front and back rollers, that provide compaction of the surface. An operator cab may be positioned between the rollers. The drums in such a compactor, referred to as tandem drums, may vibrate or be static, and may be driven by a motor mounted in or under the operator cab.

As its name implies, a single drum compactor only includes a single compacting drum. A conventional single drum compactor may include drive tires that propel the compactor and an operator cab positioned between the drum and the drive tires. For light duty, walk behind single drum compactors are also known. Such compactors may be driven by motors provided within the drum, such as the walk-behind compactor illustrated in U.S. Pat. No. 3,052,167.

The use of a single drum in a compactor may reduce the complexity of the unit, which may result in ease of manufacturing, lower material costs, and/or reduced operational or maintenance expenses. However, for a single drum roller, stability is an issue, particularly in heavy duty applications for which a walk-behind compactor is not suitable.

SUMMARY

This summary is provided to introduce simplified concepts that are further described below in the Detailed Description. This summary is not intended to identify essential features of the claimed subject matter, nor is it intended for use in determining the scope of the claimed subject matter.

A surface compactor machine according to some embodiments includes a cylindrical drum defining a cylindrical space in an interior portion of the cylindrical drum and having a central axis of rotation and a counterweight in the cylindrical space. The surface compactor machine further includes a non-driven support wheel. The non-driven support wheel is in contact with an underlying portion of an interior surface of the cylindrical drum beneath the counterweight, and the non-driven support wheel rotates about a second axis of rotation. A drive motor is provided in the cylindrical space, and a drive wheel is mechanically rotatable by the drive motor. The drive wheel contacts an inner surface of the cylindrical drum such that rotation of the drive wheel by the drive motor urges the cylindrical drum to rotate about the central axis of rotation.

A support bracket may be attached to the counterweight and the non-drive support wheel, and may suspend the counterweight in spaced relation to the cylindrical drum.

A surface compactor machine according to further embodiments includes a first cylindrical drum defining a first cylindrical space in an interior portion of the first cylindrical drum and having a central axis of rotation, and a second cylindrical drum defining a second cylindrical space in an interior portion of the second cylindrical drum and rotatably coupled in a coaxial arrangement to the first cylindrical drum. The first cylindrical drum and the second cylindrical drum rotate independently about the central axis of rotation. The compactor further includes a counterweight in a lower portion of the first cylindrical space and the second cylindrical space, and first and second non-driven support wheels affixed to the counterweight. The first non-driven support wheel contacts an interior surface of the first cylindrical drum beneath the counterweight and the second non-driven support wheel contacts an interior surface of the second cylindrical drum beneath the counterweight. A major portion of the weight of the counterweight is transmitted to the first and second cylindrical drums through the respective first and second non-driven support wheels.

ASPECTS OF THE INVENTIVE CONCEPTS

In one aspect, a surface compactor machine includes a cylindrical drum defining a cylindrical space in an interior portion of the cylindrical drum and having a central axis of rotation, and a counterweight in the cylindrical space. The counterweight is suspended in spaced relation from the cylindrical drum. The compactor further includes a non-driven support wheel affixed to the counterweight. The non-driven support wheel is in contact with a bottom portion of an interior surface of the cylindrical drum beneath the counterweight, and the non-driven support wheel rotates about a second axis of rotation. A drive motor is provided in the cylindrical space, and a drive wheel is mechanically coupled to the drive motor. The drive wheel contacts an inner surface of the cylindrical drum such that rotation of the drive wheel by the drive motor urges the cylindrical drum to rotate about the central axis of rotation.

A support bracket may be attached to the counterweight and the non-drive support wheel, and may suspend the counterweight in spaced relation to the cylindrical drum.

In a further aspect, the surface compactor machine includes an electrical generator on the counterweight opposite the non-driven support wheel. The generator is electrically coupled to the drive motor to provide electric power to the drive motor.

In a further aspect, the surface compactor machine includes an engine on the counterweight opposite the non-driven support wheel. The engine includes a drive shaft coupled to the generator and provides mechanical energy to the generator to generate electrical energy for powering the drive motor.

In a further aspect, the non-driven support wheel carries a greater amount of a weight of the counterweight than the drive wheel.

In a further aspect, the drive wheel is spring biased against the inner surface of the cylindrical drum.

In a further aspect, the surface compactor machine includes a circular track on the interior surface of the cylindrical drum, and the drive wheel is aligned to the circular track. The circular track may in some aspects be geared.

In a further aspect, the surface compactor machine further includes a second cylindrical drum defining a second cylindrical space in an inner portion thereof, wherein the second cylindrical space is coaxially arranged with and rotatably coupled to the first cylindrical drum, and the counterweight extends into the second cylindrical drum. The surface compactor machine includes a second support bracket in the second cylindrical drum, wherein the counterweight is affixed to the second support bracket and is suspended in spaced relation from the second cylindrical drum by the second support bracket, a second non-driven support wheel affixed to the second support bracket, wherein the second non-driven support wheel is in contact with an interior surface of the second cylindrical drum beneath the counterweight, and the second non-driven support wheel is coaxial with the first non-driven support wheel such that the second non-driven support wheel rotates about the second axis of rotation. The surface compactor machine further includes a second drive motor affixed to the second support bracket, and a second drive wheel mechanically coupled to the second drive motor, wherein the second drive wheel contacts an inner surface of the second cylindrical drum such that rotation of the second drive wheel by the second drive motor urges the second cylindrical drum to rotate about the central axis of rotation.

In a further aspect, the first cylindrical drum and the second cylindrical drum are independently rotatable about the central axis of rotation.

In a further aspect, the surface compactor machine includes a third drive motor affixed to the first support bracket, a third drive wheel mechanically coupled to the third drive motor, wherein the third drive wheel is circumferentially offset within the cylindrical space relative to the first drive wheel, and the third drive wheel contacts an inner surface of the first cylindrical drum such that rotation of the third drive wheel by the third drive motor urges the first cylindrical drum to rotate about the central axis of rotation, a fourth drive motor affixed to the second support bracket, and a fourth drive wheel mechanically coupled to the fourth drive motor, wherein the fourth drive wheel is circumferentially offset within the cylindrical space relative to the second drive wheel, and the fourth drive wheel contacts an inner surface of the second cylindrical drum such that rotation of the fourth drive wheel by the fourth drive motor urges the second cylindrical drum to rotate about the central axis of rotation.

In a further aspect, the surface compactor machine includes a second drive motor affixed to the support bracket and a second drive wheel mechanically coupled to the second drive motor. The second drive wheel is circumferentially offset within the cylindrical space relative to the first drive wheel, and the second drive wheel contacts an inner surface of the cylindrical drum such that rotation of the second drive wheel by the second drive motor urges the cylindrical drum to rotate about the central axis of rotation.

In a further aspect, the surface compactor machine includes a vibration motor mounted on the counterweight, the vibration motor including a second drive shaft and an eccentric weight affixed to the second drive shaft.

In a further aspect, a center of gravity of the compactor is beneath the central axis of rotation.

In a further aspect, the drive wheel is positioned between the counterweight and an end portion of the cylindrical drum.

In a further aspect, the drive wheel is non-weight bearing.

A surface compactor machine according to a further aspect includes a first cylindrical drum defining a first cylindrical space in an interior portion of the first cylindrical drum and having a central axis of rotation, and a second cylindrical drum defining a second cylindrical space in an interior portion of the second cylindrical drum and positioned in a coaxial arrangement relative to the first cylindrical drum. The first cylindrical drum and the second cylindrical drum rotate independently about the central axis of rotation. The compactor further includes a counterweight in a lower portion of the first cylindrical space and the second cylindrical space, the counterweight having a weight, and first and second non-driven support wheels affixed to the counterweight. The first non-driven support wheel contacts an interior surface of the first cylindrical drum beneath the counterweight and the second non-driven support wheel contacts an interior surface of the second cylindrical drum beneath the counterweight, and a major portion of the weight of the counterweight is transmitted to the first and second cylindrical drums through the respective first and second non-driven support wheels.

In a further aspect, the surface compactor machine may further include a first drive wheel within the first cylindrical space and arranged to impart rotational movement to the first cylindrical drum, and a second drive wheel within the second cylindrical space and arranged to impart rotational movement to the second cylindrical drum independent of the rotation of the first cylindrical drum.

A surface compactor machine according to further aspects includes a first support bracket in the first cylindrical space and a second support bracket in the second cylindrical space. The first support bracket is attached to the counterweight and the first non-driven support wheel in the first cylindrical space and the second support bracket is attached to the counterweight and the second non-driven support wheel in the second cylindrical space.

In a further aspect, the surface compactor machine includes a first drive motor coupled to the first drive wheel, a second drive motor coupled to the second drive wheel, and a control circuit coupled to the first drive motor and the second drive motor and configured to independently control the first drive motor and the second drive motor.

In a further aspect, the first drive wheel and the second drive wheel are positioned below the central axis of rotation and are urged into mechanical contact with the first cylindrical drum and the second cylindrical drum, respectively, at least partly by the weight of the counterweight.

In a further aspect, rotation of the first and second non-driven support wheels occurs in response to rotation of the first and second cylindrical drums, respectively.

In a further aspect, the surface compactor machine includes a third drive wheel within the first cylindrical space and arranged to impart rotational movement to the first cylindrical drum, and a fourth drive wheel within the second cylindrical space and arranged to impart rotational movement to the second cylindrical drum. The third drive wheel is positioned symmetrically within the first cylindrical space relative to the first drive wheel, and the fourth drive wheel is positioned symmetrically within the second cylindrical space relative to the second drive wheel.

DETAILED DESCRIPTION OF EMBODIMENTS

While embodiments of the inventive concepts are illustrated and described herein, the device may be embodied in many different configurations, forms and materials. The present disclosure is to be considered as an exemplification of the principles of the inventive concepts and the associated functional specifications for their construction and is not intended to limit the inventive concepts to the embodiments illustrated. Those skilled in the art will envision many other possible variations within the scope of the present inventive concepts.

Figure 1:
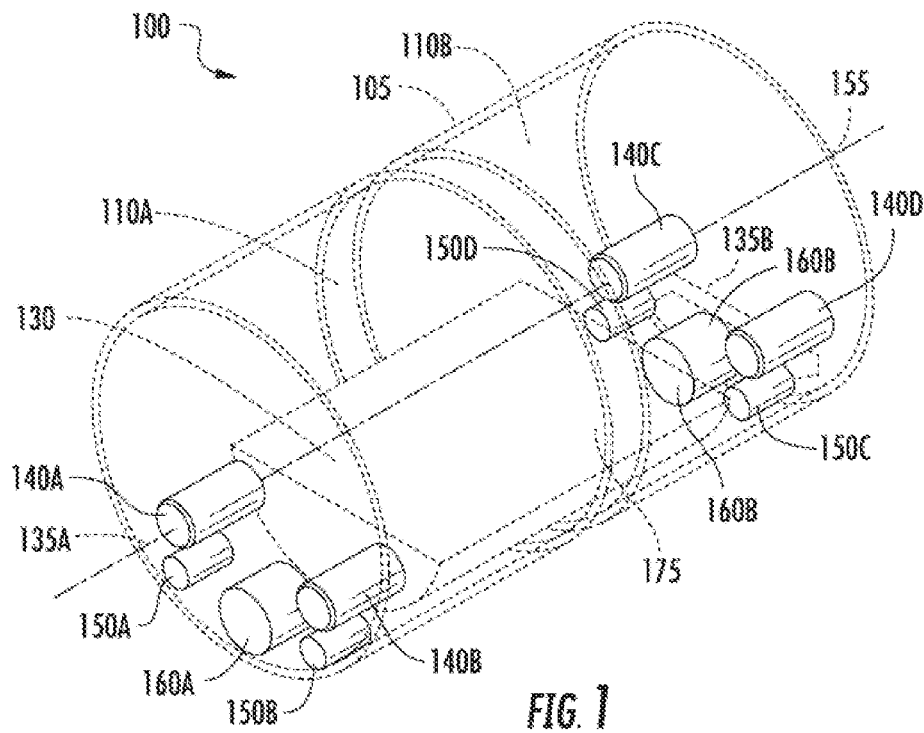
FIG. 1 is a perspective view of a single drum surface compactor machine according to some embodiments.
Figure 2:
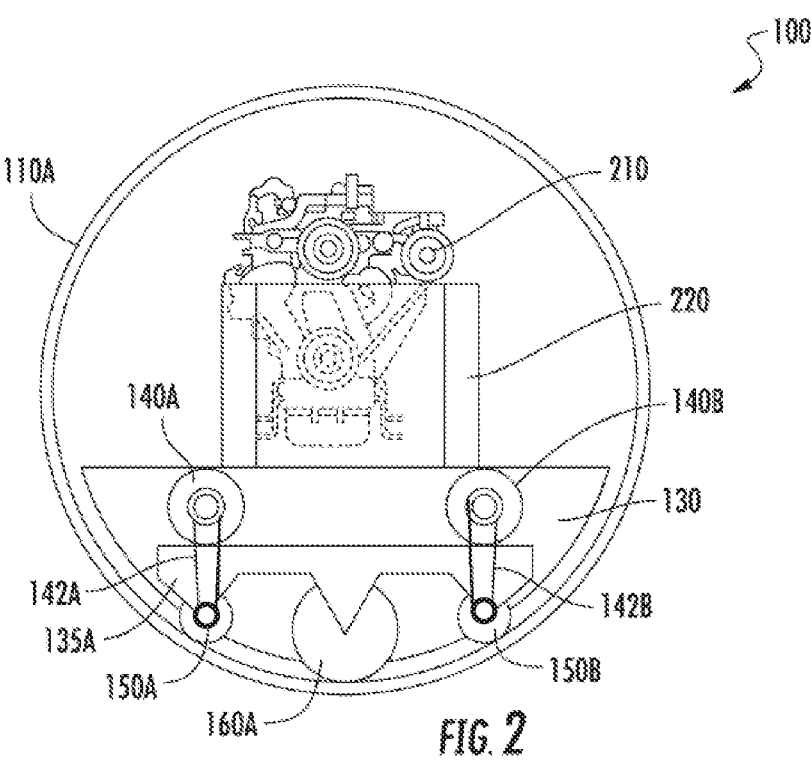
FIG. 2 is a side cross-sectional view of a single drum surface compactor machine according to some embodiments.
Figure 3:
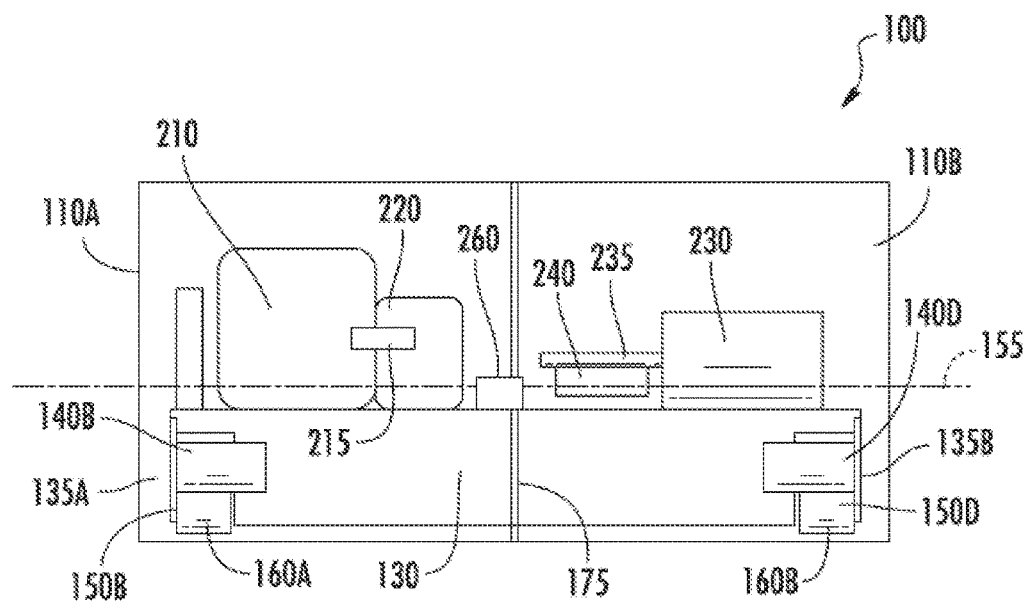
FIG. 3 is a front cross-sectional view of a single drum surface compactor machine according to some embodiments.

Turning now to FIGS. 1, 2 and 3, a single roller surface compactor machine 100 according to some embodiments is depicted. In particular, FIG. 1 is a perspective view, FIG. 2 is a side cross-sectional view and FIG. 3 is a front cross-sectional view of a single drum surface compactor machine 100 according to some embodiments of the inventive concepts.

As shown in FIGS. 1 to 3, the surface compactor machine 100 is a rolling compactor provided with a single roller 105 having a split roller configuration. In some embodiments, the roller 105 includes first and second drums 110A, 110B that are attached via a rotational coupling 175 that permits independent rotation of the first and second drums 110A, 110B along a common axis of rotation 155. Split roller configurations are known in the art. In some embodiments, the surface compactor machine 100 may be a remotely controlled or autonomous vehicle.

In operation, the roller 105 propels the surface compactor machine 100 along a substrate to be compacted, such as asphalt, earth, rocks, etc. As the compactor 100 moves across a substrate, the roller 105 applies a compaction force to the substrate.

As illustrated in FIGS. 1 to 3, the rolling compactor 100 is provided with compacting surfaces in the form of first and second drums 110A, 110B that are cylindrical in shape. The outer circumferential surfaces of the drums 110A, 110B contact the substrate that is to be compacted. As the roller 105 propels the surface compactor machine 100 along the substrate, the drums 110A, 110B exert a heavy compacting force on the substrate.

According to some embodiments, the roller 110 is driven by one or more electric motors positioned within an interior cylindrical space defined by the first and second drums 110A, 110B. In the embodiments illustrated in FIGS. 1 to 3, the compactor 100 includes first to fourth electric motors 140A, 140B, 140C, 140D mounted within a cylindrical interior space defined by the first and second drums 110A, 110B. The first and second electric motors 140A, 140B are mounted on a first support bracket 135A in the first drum 140A, while the third and fourth electric motors 140C, 140D are mounted on a second support bracket 135B in the second drum 140B. Each of the first to fourth electric motors 140A to 140D is coupled, for example, via a drive chain 142A, 142B, drive shaft, drive belt, direct gear drive and/or other drive mechanism, to a respective drive wheel 150A to 150D, such that each electric motor 140A to 140D causes the respective drive wheel 150A to 150D to turn.

The first and second drive wheels 150A, 150B are mounted to the first support bracket 135A, while the third and fourth drive wheels 150C, 150D are mounted to the second support bracket 135B. The first and second drive wheels 150A, 150B are positioned to be in contact with an inner surface of the first drum 110A, while the third and fourth drive wheels 150C, 150D are positioned to be in contact with an inner surface of the second drum 110B. In some embodiments, the first and second drive wheels 150A, 150B are positioned to be in contact with a first track 175 (FIG. 4) provided an inner surface of the first drum 110A, while the third and fourth drive wheels 150C, 150D are positioned to be in contact with a second track 175 (FIG. 4) provided an inner surface of the second drum 110B. The track may include a rail, channel, slot, gear teeth, or any other suitable feature that maintains contact with the drive wheels 150C, 150D.

The first and second drive wheels 150A, 150B may be circumferentially offset from one another, while the third and fourth drive wheels 150C, 150D may be circumferentially offset from one another. For example, as illustrated in FIG. 2, the first and second drive wheels 150A, 150B may be circumferentially offset from one another by an angle of about 60 degrees.

The first and second drive wheels 150A, 150B may in some embodiments be spring biased against the interior surface of the first drum 110A, and the third and fourth drive wheels 150C, 150D may be spring biased against the interior surface of the second drum 110B so that the drive wheels maintain a firm contact on the interior surfaces of the respective drums. In some embodiments, the drive wheels 150A-150D may be biased against the drums 110A, 110B using leaf springs, coil springs or any other suitable spring mechanism. In yet other embodiments the drive wheels 150A-150D may be held in place against the drums 110A, 110B using only gravity. In still other embodiments the drive wheels may engage respective circular tracks on the interior surfaces of the drums 110A, 110B.

Accordingly, when the first and second drive wheels 150A, 150B are driven by the respective electric motors 140A, 140B, a torque is transmitted to the first drum 110A, causing the first drum 110A to rotate. Likewise, when the third and fourth drive wheels 150C, 150D are driven by the respective electric motors 140C, 140D, a torque is transmitted to the second drum 110B, causing the second drum 110B to rotate.

It will be appreciated that the first and second drive wheels 150A, 150B may be driven independently from the third and fourth drive wheels 150C, 150D, so that the first drum 110A and the second drum 110A may be rotated independently of one another by the drive wheels 150A to 150D. For example, the first drum 110A and the second drum 110B may be rotated at different speeds and/or in different directions by their respective drive wheels. Allowing the drums 110A, 110B to rotate at different speeds may reduce shearing forces that may be transmitted to the substrate when the compactor 100 is driven in a curved path over the substrate.

The compactor 100 further includes a counterweight 130 positioned within the cylindrical interior space defined by the first drum 110A and the second drum 110B. The counterweight 130 may provide a major portion of the weight of the compactor 100. For example, in some embodiments suitable for heavy duty operation, the counterweight 130 may have a weight greater than 100 kilograms, and in further embodiments greater than 500 kilograms. The counterweight 130 may be attached at opposite ends thereof to the first support bracket 135A and the second support bracket 135B, which suspend the counterweight 130 in a spaced relation to the drums 110A, 110B.

In some embodiments, the first to fourth drive wheels 150A to 150D may bear at least part of the weight of the counterweight 130. For example, as illustrated in FIG. 2, since the drive wheels 150A and 150B are positioned on the support frame beneath the counterweight 130, they may support at least some of the weight of the counterweight 130. In other embodiments, one or more of the drive wheels may be positioned such that they do not bear any of the weight of the counterweight 130. For example, in some embodiments, one or more of the drive wheels 150A to 150D may contact the inner surface of the drum 110A, 110B above the counterweight 130.

It will be appreciated that the first support bracket 135A and the second support bracket 135B may be separate frames as illustrated in FIGS. 1 and 3. However, in other embodiments, the first and second support brackets 135A, 135B may be joined or connected together, or provided as a unitary support bracket that extends into interior spaces of both the first drum 110A and the second drum 110B. Moreover, the support bracket may extend above the upper surface of the counterweight 130.

A first non-driven support wheel 160A is attached to the first support bracket 135A, and a second non-driven support wheel 160B is attached to the second support bracket 135B. The first and second non-driven support wheels 160A, 160B may rotate around a common axis of rotation that is parallel to the axis of rotation of the drums 110A, 110B. The first non-driven support wheel 160A is positioned in a lower portion of the first drum 110A, and rests against a lower portion of the first drum 110A. Likewise, the second non-driven support wheel 160B is positioned in a lower portion of the second drum 110B, and rests against a lower portion of the second drum 110B. The first and second non-driven support wheels 160A, 160B thereby carry a major portion of the weight of the counterweight 130 and the first and second support brackets 135A, 135B, as well as the weight of other items supported by the counterweight 130 and/or the first and second frames 135A, 135B, as discussed below. The weight carried by the first non-driven support wheel 160A is transmitted directly to the lower portion of the first drum 110A, while the weight carried by the second non-driven support wheel 160B is transmitted directly to the lower portion of the second drum 110B. The non-drive support wheels 160A, 160B may collectively carry a major portion of the weight of the counterweight 130, while the drive wheels 150A to 150D may collectively carry a minor portion of the weight of the counterweight 130. In some embodiments, the first and second non-driven support wheels 160A, 160B may ride in or on channels 175 (FIG. 4) provided on the inner surfaces of the first and second drums 110A, 110B.

Because a major portion of the weight of the counterweight 130 is carried by the first and second non-driven support wheels 160A, 160B rather than by the drive wheels 150A to 150D, a mechanical stress on the drive wheels 150A to 150D may be reduced. Since the drive wheels 150A to 150D do not need to carry a major portion of the weight of the counterweight 130, the drive wheels 150A to 150D and associated mounting/support hardware may be smaller and/or less expensive than would otherwise be required, and/or may be positioned at different locations than would otherwise be required if the drive wheels were required to carry a major portion of the weight of the counterweight 130. By non-driven, it is meant that the non-driven support wheels 160A, 160B are allowed to rotate freely about their axis of rotation, which may be defined by axles (not shown) that extend through/into the non-driven support wheels 160A, 160B, and are not driven by one or more motors. Rather than being driven by motors, the non-driven support wheels 160A, 160B may rotate in response to rotation of the first and second drums 110A, 110B. Moreover, as the drums 110A, 110B roll in one direction (e.g., clockwise), the non-driven support wheels 160A, 160B may roll in an opposite direction (e.g., counter-clockwise) to keep the counterweight positioned near the bottom of the cylindrical space defined by the drums 110A, 110B.

The first and second drive wheels 150A, 150B may be disposed on opposite sides of the first non-driven support wheel 160A within the first drum 110A in a symmetric fashion as illustrated in FIG. 2. Similarly, the third and fourth drive wheels 150C, 150D may be disposed on opposite sides of the second non-driven support wheel 160B within the second drum 110B in a symmetric fashion.

Referring to FIGS. 2 and 3, the counterweight 130 may have a generally semi-cylindrical shape that fits within a bottom portion of the cylindrical space defined by the first and second drums 110A, 110B. Because the counterweight 130 accounts for a major portion of the total weight of the compactor 100, a center of gravity of the compactor 100 may be located substantially beneath the central axis 155 of the drums 110A, 110B.

Still referring to FIGS. 2 and 3, a number of other components of the compactor 100 may be mounted on the counterweight 130. For example, an engine 210 and a generator 220 may be mounted on and supported by the counterweight 130. The engine 210 may include a drive shaft 215 that drives the generator 220. The generator 220 responsively generates electric power that is used to drive the drive motors 140A to 140D. A control circuit 260 controls the individual speeds of the drive motors 140A to 140D.

A vibration mechanism may be provided within the cylindrical drum. The vibration mechanism is configured to vibrate the counterweight and thereby the entire drum to improve the compaction rate of the substrate. In the illustrated embodiments, the vibration mechanism includes a vibration motor 230 mounted on the counterweight 130. The vibration motor 230 includes an output shaft 235 and an eccentric weight 240 attached to the output shaft 235. When the vibration motor spins the output shaft 235 and the eccentric weight 240, a vibrational force is applied to the first and second drums 110A, 110B through the counterweight 130. In this manner, the first and second drums 110A, 110B may be vibrated during operation of the compactor 100. Operation of the vibration motor may also be controlled by the control circuit 260. Other vibration mechanisms may be provided instead or or in addition to the vibration mechanism illustrated in FIGS. 2 and 3.

Figure 4:
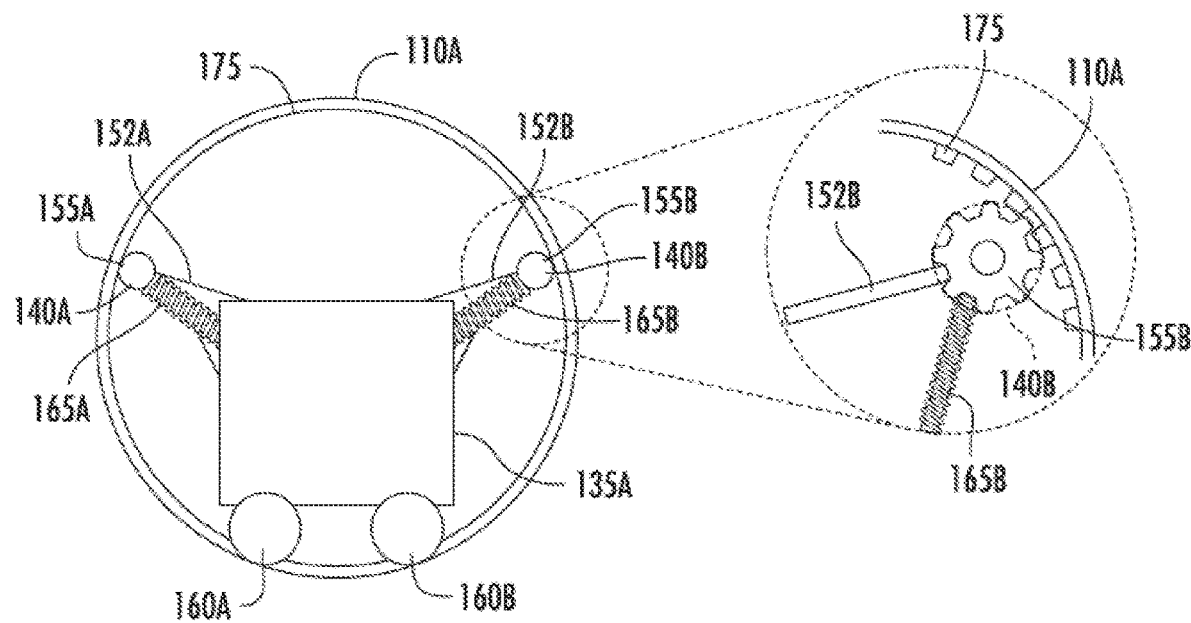
FIG. 4 is a side cross-sectional view of a single drum surface compactor machine according to some embodiments.

FIG. 4 is a side cross-sectional view of a single drum compactor 100 according to some embodiments. In FIG. 4, some of the elements of the single drum compactor 100 are omitted for clarity. In the embodiments of FIG. 4, drive motors 140A, 140B are mounted above the frame 135A in an upper portion of the first drum 110A above the central axis of rotation 155 (FIG. 3) and do not bear the weight of the counterweight 130 (FIG. 3). The drive motors 140A, 140B are mounted on struts 152A, 152B and spring-biased against the first drum 110A by coil springs 165A, 165B, although other types of springs or bias means may be employed. Geared drive wheels 155A, 155B are driven directly the respective drive motors 140A, 140B. The geared drive wheels 155A, 155B engage respective inner teeth on a circular gear track 175 on an inner surface of the first drum 110A. In the embodiments of FIG. 4, two non-driven support wheels 160A, 160B are provided that support the weight of the frame 135A and the counterweight 130.

Figure 5:
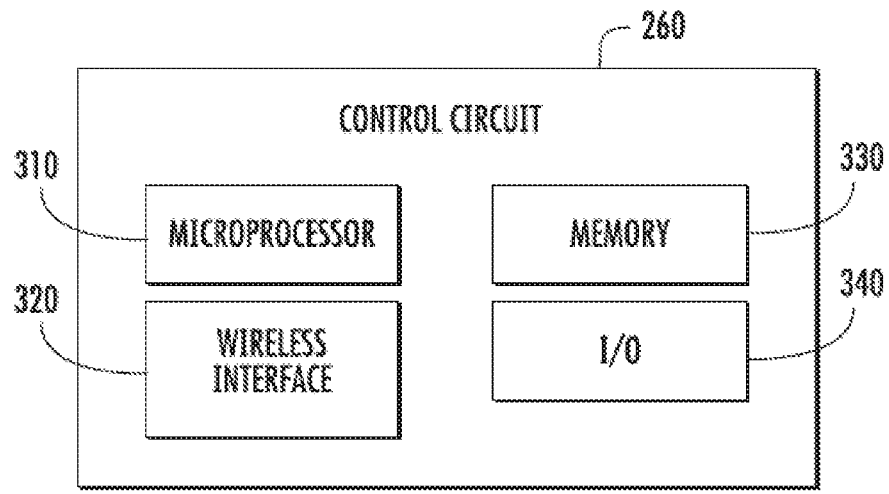
FIG. 5 is a block diagram of a control circuit for a single drum surface compactor machine according to some embodiments.

FIG. 5 is a block diagram of a control circuit 260 according to some embodiments. In particular, the control circuit 260 may include a microprocessor or microcontroller circuit 310, a memory 330, a wireless interface 320, and an input/output (I/O) interface 340. The microprocessor 310 may communicate with the other elements of the control circuit 260 through a system bus, I2C connection or other connection. In some embodiments, the system bus may conform to the J1939 communication standard for vehicles. Other protocols, such as CANopen and LIN may also be used. The memory 330 may include a volatile or nonvolatile RAM, ROM, EPROM or other suitable storage. The wireless interface 320 enables the control circuit 260 to communicate with external devices, such as an external remote control device, sensors, telemetry devices, etc., using a wireless communication protocol, such as Bluetooth, WiFi, etc. The I/O interface 340, which may for example include a universal asynchronous receive transmit (UART) interface, enables the control circuit 260 to communicate with other electronic elements of the compactor 100.

In some embodiments, the electrical system of the compactor 100 may include separate DC and AC components. The generator would possibly be AC generator possibly driving AC motors depending on the economics. A rectified DC (12V or 24V) system may also be provided to run vehicle controls, such as an Engine Control unit, peripherals, etc. A battery may also be provided to assist in startup of the engine 210 and/or vibration motor 230.

Figure 6:
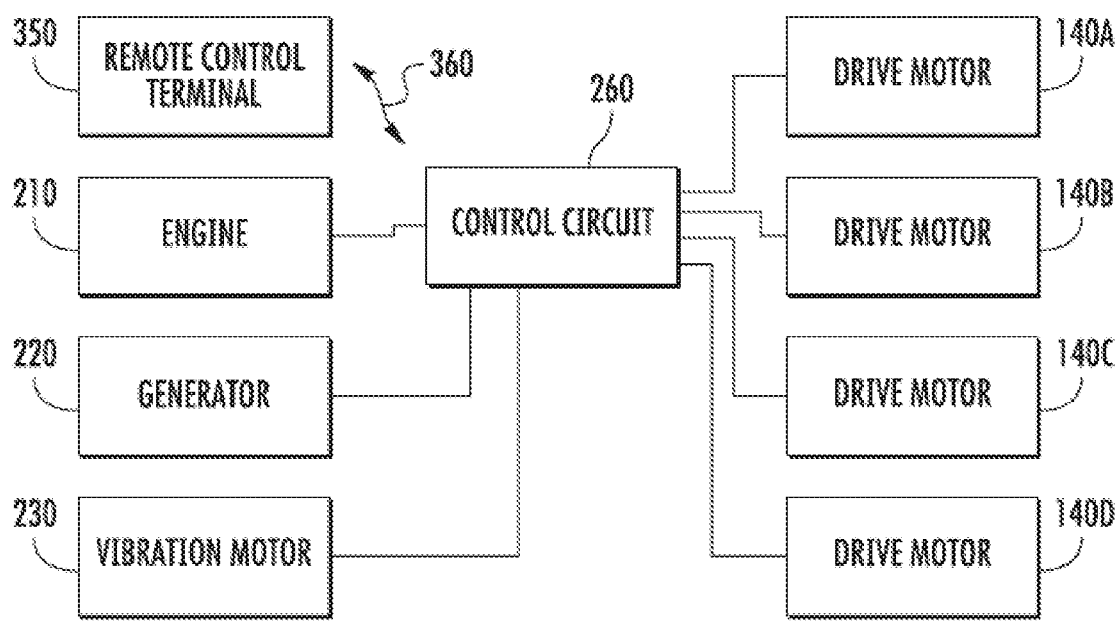
FIG. 6 is a block diagram that illustrates interconnections between the control circuit and other elements of a single drum surface compactor machine according to some embodiments.

FIG. 6 is a block diagram that illustrates electrical interconnections between the control circuit 260 and other elements of a single drum compactor 100 according to some embodiments. As shown in FIG. 5, the control circuit 260 may be electrically connected to and control operation of the engine 210, the generator 220, the vibration motor 230 and the drive motors 140A to 140D. The control circuit 260 may also be connected via a wireless interface 360 to a remote control terminal 350 that can be used to remotely control operation of the compactor 100.

Accordingly, a compactor 100 as described herein may operate autonomously and/or through remote control. That is, the compactor 100 may not be attached to a cab or to external drive wheels, but instead may be a self-contained unit as shown. In other embodiments however, the compactor 100 may be attached to other elements, such as external wheels for stability, an operator cab, etc.

Figure 7:
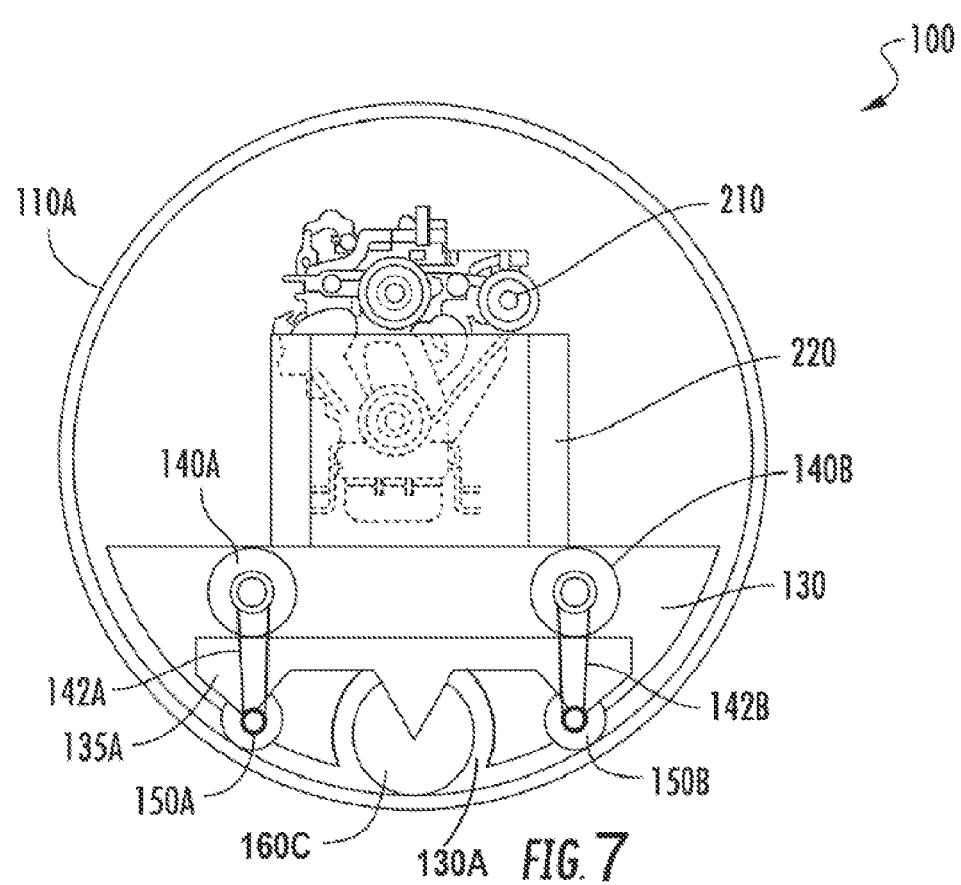
FIG. 7 is a side cross-sectional view of a single drum surface compactor machine according to further embodiments.

FIG. 7 is a side cross-sectional view of a single drum surface compactor machine according to some embodiments. As shown in FIG. 7, in some embodiments, a single non-driven support wheel 160C is provided. The single non-driven support wheel 160C extends underneath the counterweight 130 through a longitudinal channel or opening 130A in the bottom of the counterweight 130. The single non-driven support wheel 160C may be connected at opposite ends to the first and second support brackets 135A, 135B. The single non-driven support wheel 160C may have a split configuration to allow independent rotation thereof in each of the drums 110A, 110B.

The foregoing description of the embodiments of the inventive concepts has been presented for the purpose of illustration and is not intended to be exhaustive or to limit the invention to the precise forms disclosed. Persons skilled in the relevant art can appreciate that many modifications and variations are possible in light of the above teachings. It is therefore intended that the scope of the inventive concepts be limited not by this detailed description, but rather by the claims appended hereto.

What is claimed is:

1. A surface compactor machine, comprising:
   a cylindrical drum defining a cylindrical space in an interior portion of the cylindrical drum and having a central axis of rotation;
   a counterweight within the cylindrical space;
   a non-driven support wheel affixed to the counterweight, wherein the non-driven support wheel is in contact with an underlying portion of an interior surface of the cylindrical drum beneath the counterweight, and wherein the non-driven support wheel rotates about a second axis of rotation;
   a drive motor in the cylindrical space; and
   a drive wheel mechanically rotatable by the drive motor, wherein the drive wheel contacts an inner surface of the cylindrical drum such that rotation of the drive wheel by the drive motor urges the cylindrical drum to rotate about the central axis of rotation.

2. The surface compactor machine of claim 1, further comprising:
   an electrical generator on the counterweight opposite the non-driven support wheel, wherein the generator is electrically coupled to the drive motor to provide electric power to the drive motor.

3. The surface compactor machine of claim 2, further comprising:
   an engine on the counterweight opposite the non-driven support wheel, the engine including a drive shaft coupled to the generator and providing mechanical energy to the generator to generate electrical energy for powering the drive motor.

4. The surface compactor machine of claim 1, wherein the non-driven support wheel carries a greater amount of a weight of the counterweight than the drive wheel.

5. The surface compactor machine of claim 1, wherein the drive wheel is spring biased against the inner surface of the cylindrical drum.

6. The surface compactor machine of claim 1, further comprising a circular track on the interior surface of the cylindrical drum, wherein the drive wheel is aligned to the circular track.

7. The surface compactor machine of claim 1, further comprising:

a support bracket in the cylindrical space;
wherein the counterweight and the non-drive support wheel are affixed to the support bracket; and
wherein the support bracket suspends the counterweight in spaced relation from the interior surface of the cylindrical drum.

8. The surface compactor machine of claim 7, wherein the drive wheel comprises a first drive wheel, the surface compactor machine further comprising:
a second drive motor affixed to the support bracket; and
a second drive wheel mechanically coupled to the second drive motor, wherein the second drive wheel is circumferentially offset within the cylindrical space relative to the first drive wheel, and wherein the second drive wheel contacts an inner surface of the cylindrical drum such that rotation of the second drive wheel by the second drive motor urges the cylindrical drum to rotate about the central axis of rotation.

9. The surface compactor machine of claim 7, wherein the support bracket comprises a first support bracket, the cylindrical drum comprises a first cylindrical drum, the drive motor comprises a first drive motor, and the drive wheel comprises a first drive wheel, the compactor further comprising:
a second cylindrical drum defining a second cylindrical space in an inner portion thereof, wherein the second cylindrical space is coaxially arranged with and rotatably coupled to the first cylindrical drum, and wherein the counterweight extends into the second cylindrical drum;
a second support bracket in the second cylindrical drum, wherein the counterweight is affixed to the second support bracket and is suspended in spaced relation from the second cylindrical drum by the second support bracket;
a second non-driven support wheel affixed to the second support bracket, wherein the second non-driven support wheel is in contact with an interior surface of the second cylindrical drum beneath the counterweight, and wherein the second non-driven support wheel is coaxial with the first non-driven support wheel such that the second non-driven support wheel rotates about the second axis of rotation;
a second drive motor affixed to the second support bracket; and
a second drive wheel mechanically coupled to the second drive motor, wherein the second drive wheel contacts an inner surface of the second cylindrical drum such that rotation of the second drive wheel by the second drive motor urges the second cylindrical drum to rotate about the central axis of rotation.

10. The surface compactor machine of claim 9, wherein the first cylindrical drum and the second cylindrical drum are independently rotatable about the central axis of rotation.

11. The surface compactor machine of claim 9, further comprising:
a third drive motor affixed to the first support bracket;
a third drive wheel mechanically coupled to the third drive motor, wherein the third drive wheel is circumferentially offset within the cylindrical space relative to the first drive wheel, and wherein the third drive wheel contacts an inner surface of the first cylindrical drum such that rotation of the third drive wheel by the third drive motor urges the first cylindrical drum to rotate about the central axis of rotation;
a fourth drive motor affixed to the second support bracket; and a fourth drive wheel mechanically coupled to the fourth drive motor, wherein the fourth drive wheel is circumferentially offset within the cylindrical space relative to the second drive wheel, and wherein the fourth drive wheel contacts an inner surface of the second cylindrical drum such that rotation of the fourth drive wheel by the fourth drive motor urges the second cylindrical drum to rotate about the central axis of rotation.

12. The surface compactor machine of claim 1, further comprising a vibration motor mounted on the counterweight, the vibration motor including a second drive shaft and an eccentric weight affixed to the second drive shaft.

13. The surface compactor machine of claim 1, wherein a center of gravity of the compactor is beneath the central axis of rotation.

14. The surface compactor machine of claim 1, wherein the drive wheel is positioned between the counterweight and an end portion of the cylindrical drum.

15. The surface compactor machine of claim 1, wherein the drive wheel is non-weight bearing.

16. A surface compactor machine, comprising:
a first cylindrical drum defining a first cylindrical space in an interior portion of the first cylindrical drum and having a central axis of rotation;
a second cylindrical drum defining a second cylindrical space in an interior portion of the second cylindrical drum and rotatably coupled in a coaxial arrangement to the first cylindrical drum, wherein the first cylindrical drum and the second cylindrical drum are independently rotatable about the central axis of rotation;
a counterweight in a lower portion of the first cylindrical space and the second cylindrical space, the counterweight having a weight;
first and second non-driven support wheels affixed to the counterweight, wherein the first non-driven support wheel contacts an interior surface of the first cylindrical drum beneath the counterweight and the second non-driven support wheel contacts an interior surface of the second cylindrical drum beneath the counterweight, and wherein a major portion of the weight of the counterweight is transmitted to the first and second cylindrical drums through the respective first and second non-driven support wheels;
a first drive wheel within the first cylindrical space and arranged to impart rotational movement to the first cylindrical drum; and
a second drive wheel within the second cylindrical space and arranged to impart rotational movement to the second cylindrical drum independent of the rotation of the first cylindrical drum.

17. The surface compactor machine of claim 16, further comprising a first support bracket in the first cylindrical space and a second support bracket in the second cylindrical space, wherein the first support bracket is attached to the counterweight and the first non-driven support wheel in the first cylindrical space and the second support bracket is attached to the counterweight and the second non-driven support wheel in the second cylindrical space.

18. The surface compactor machine of claim 17, further comprising a first drive motor coupled to the first drive wheel, a second drive motor coupled to the second drive wheel, and a control circuit coupled to the first drive motor and the second drive motor and configured to independently control the first drive motor and the second drive motor.

19. The surface compactor machine of claim 16, wherein the first drive wheel and the second drive wheel are positioned below the central axis of rotation and are urged into mechanical contact with the first cylindrical drum and the second cylindrical drum, respectively, at least partly by the weight of the counterweight.

20. The surface compactor machine of claim 16, wherein rotation of the first and second non-driven support wheels occurs in response to rotation of the first and second cylindrical drums, respectively.

21. The surface compactor machine of claim 16, further comprising:
- a third drive wheel within the first cylindrical space and arranged to impart rotational movement to the first cylindrical drum; and
- a fourth drive wheel within the second cylindrical space and arranged to impart rotational movement to the second cylindrical drum;
- wherein the third drive wheel is positioned symmetrically within the first cylindrical space relative to the first drive wheel; and
- wherein the fourth drive wheel is positioned symmetrically within the second cylindrical space relative to the second drive wheel.

\* \* \* \* \*